March 19, 1957  R. E. STANDLEY ET AL  2,785,437
WING JOINT BREAKER FOR POULTRY
Filed May 23, 1955  2 Sheets-Sheet 1
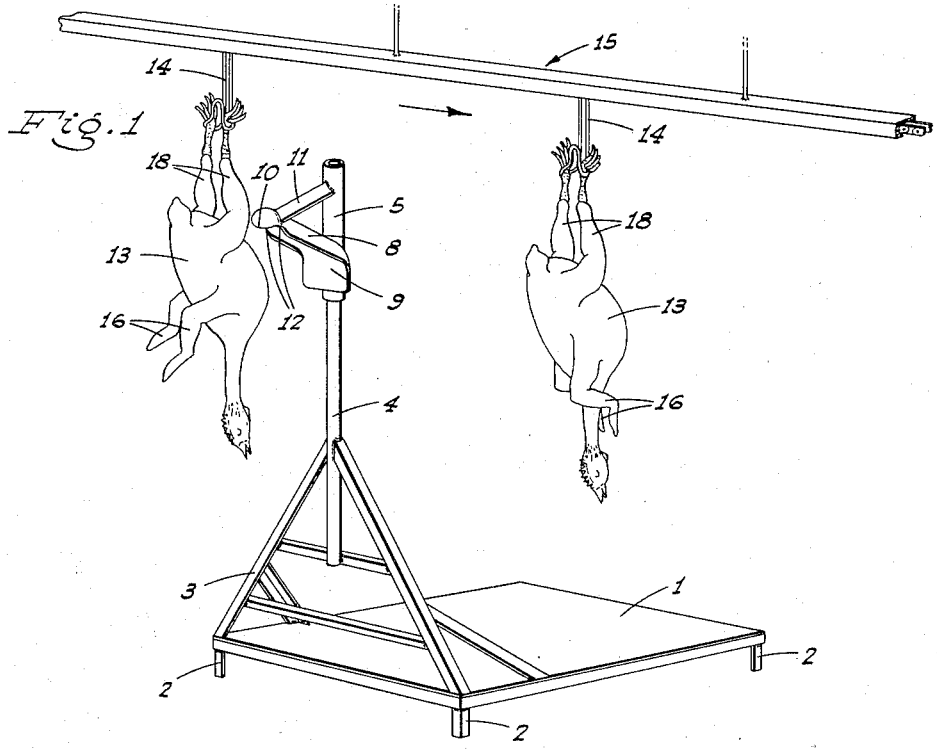
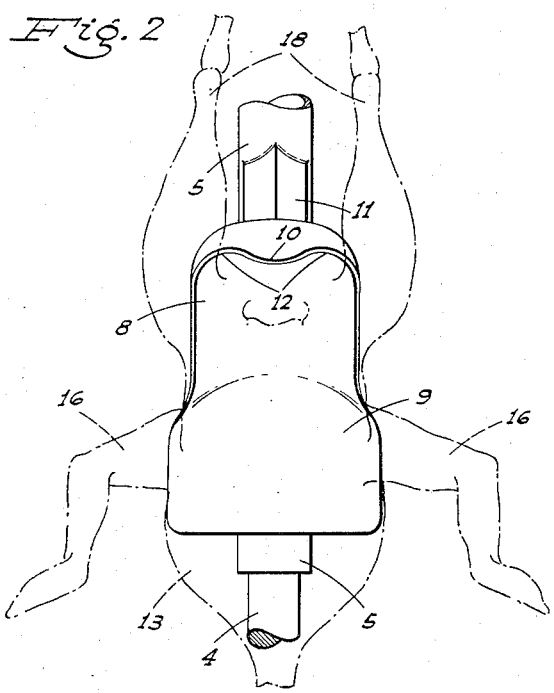
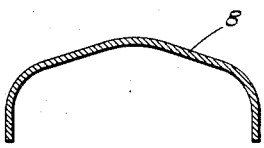
INVENTORS
Robert E. Standley
Enoch S. Christoffersen
BY Webster & Webster
ATTYS.

March 19, 1957 R. E. STANDLEY ET AL 2,785,437
WING JOINT BREAKER FOR POULTRY
Filed May 23, 1955 2 Sheets-Sheet 2
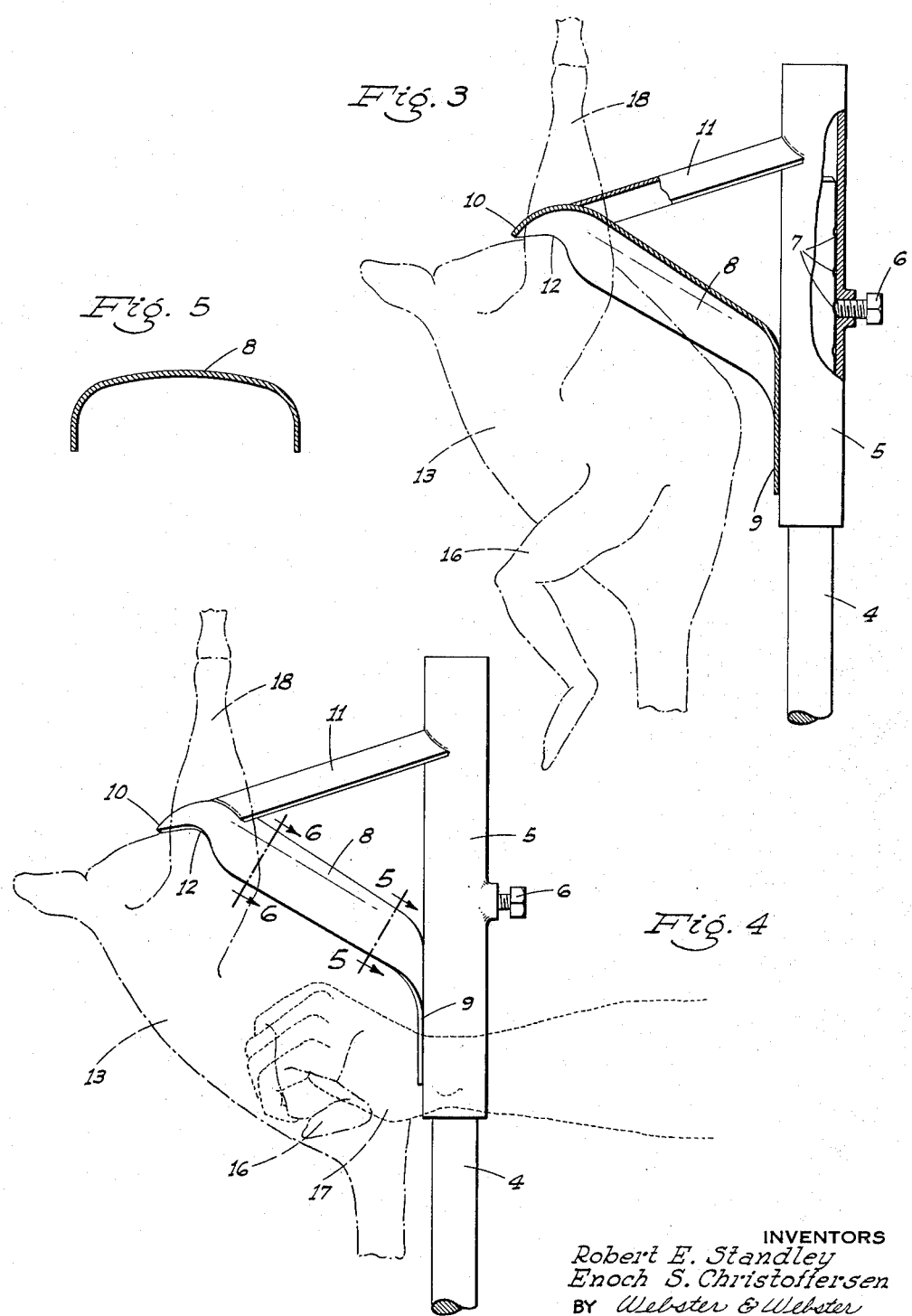
INVENTORS
Robert E. Standley
Enoch S. Christoffersen
BY Webster & Webster
ATTYS.

2,785,437

WING JOINT BREAKER FOR POULTRY

Robert E. Standley, Patterson, and Enoch S. Christoffersen, Turlock, Calif.

Application May 23, 1955, Serial No. 510,236

4 Claims. (Cl. 17—11)

This invention relates in general to a device for use in connection with the commercial processing of poultry for the market. During the course of such processing, and after the poultry has been dressed, the wing joints are broken loose from the sockets or dislocated so that the wings may be folded close to the body for compact packaging of the poultry in plastic bags or the like.

It is a major object of the invention to provide a novel device for use as an aid to the accomplishment of such dislocation, manually, of the wing joints of poultry, such as chickens or turkeys.

Another important object of this invention is to provide a device for the purpose which includes a rigidly mounted, inclined saddle into which the body of a fowl—initially disposed in front of the saddle—is engaged upon an operator, standing back of the saddle, reaching forwardly on opposite sides thereof, grasping the wings of the fowl and pulling the fowl towards such saddle; a continued pull on the wings in such direction, and by the operator, breaking or dislocating the wing joints of said fowl.

An additional object of the invention is to provide a wing joint breaker for poultry, as in the preceding paragraph, wherein the saddle is mounted in connection with a post upstanding from a platform on which the operator stands; the saddle being disposed so that it extends away from the platform, and the latter being set in a predetermined position relative to an overhead conveyor from which the individual fowl are suspended, and which conveyor is operative to locate the fowl, one at a time, in front of but closely adjacent the saddle for the wing joint breaking manipulation by said operator.

It is also an object of the invention to provide a wing joint breaker for poultry which is designed for ease and economy of manufacture, convenience of use, and ready cleansing or washing.

Still another object of the invention is to provide a practical, reliable, and durable wing joint breaker for poultry, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the device as set in position relative to the overhead conveyor; one fowl being shown as suspended directly in front of the device for the wing joint breaking operation, while another fowl is shown in an advanced position and with the wing joints broken or dislocated.

Fig. 2 is an enlarged fragmentary front elevation showing particularly the saddle and its mounting sleeve; the fowl—as initially disposed in front of the saddle—being shown in broken lines.

Fig. 3 is a side elevation, partly in section, showing the saddle and its mount; a fowl being shown—in broken lines—as partially engaged in said saddle.

Fig. 4 is a side elevation of the saddle and its mount; a fowl being shown—in broken lines—in final position in the saddle, and with the wings being pulled rearwardly to break or dislocate them from their sockets.

Fig. 5 is a transverse section of the saddle taken on line 5—5 of Fig. 4.

Fig. 6 is a transverse section of the saddle taken on line 6—6 of Fig. 4.

Referring now more particularly to the drawings, and to the characters of reference marked thereon, the device comprises a platform 1 having relatively short corner legs 2 adapted to support the platform from the floor.

At the front end thereof the platform 1 is fitted with a rigid, braced supporting frame 3 of generally triangular form which projects upwardly from said platform. The frame 3 provides the mount for a vertical post 4 which projects upwardly from the apex of the frame 3; such post being of substantial length above said frame.

On the upper end portion thereof the post 4 is fitted with a vertically adjustable sleeve 5 maintained in a selected position by means of a set screw 6 which engages at its inner end in one of a plurality of recesses 7 formed in the back side of the post 4 in a vertical row.

A saddle 8, shaped to substantially fit the pectoral contour of a fowl, extends at an upward and outward incline from the lower portion of the sleeve 5. At its inner end the saddle 8 includes a depending abutment pad 9 which is flat and faces forwardly; such pad being rigidly secured to said sleeve 5.

At its outer end the saddle 8 is formed with a rounded down-turned tip 10, and an inwardly and upwardly inclined brace 11 connects between the outer end portion of the saddle 8 and the upper part of the sleeve 5.

At the sides thereof, and substantially at the down-turned tip 10, the saddle 8 is formed—on opposite sides—with upwardly extending notches 12.

In the commercial processing of poultry each fowl 13, after it is dressed, is leg-suspended by and depends in inverted position from a hanger 14 on an overhead conveyor 15; the fowl being spaced along the length of such conveyor, all as shown in Fig. 1.

The described wing joint breaking device is disposed so that the conveyor-suspended fowls pass, one at a time, in front of but closely adjacent the saddle, with the breast of such fowl facing said saddle.

The operator stands on the platform 1, and as each fowl comes to position directly in front of the saddle 8, the operator reaches forwardly on opposite sides of said saddle, grasps the wings 16 of the adjacent fowl 13 with his hands 17, and then pulls rearwardly. This swings the body of the adjacent fowl 13 directly into the saddle 8, with such saddle encompassing the pectoral contour of the fowl; the forward or craw portion of the body of the fowl bearing against the pad 9, and the down-turned tip 10 resting over the abdominal portion.

The body of the adjacent fowl 13 may be readily pulled into such position without interference from the webs of the legs 18 by reason of the notching 12.

After the body of the adjacent fowl 13 is thus pulled into the saddle, the operator continues the rearward pull on the wings 16, and as the body of the adjacent fowl 13 is now held stationary in the saddle, such continued pull results in breaking or dislocating the joints of said wings.

The operator then releases the wings 16 from his hands 17, whereupon the adjacent fowl 13 swings out of the saddle and is progressed by the overhead conveyor 15.

With the described device the wings of poultry can be effectively, positively, and rapidly broken or dislocated so that in a subsequent processing step such wings can be readily folded against the sides of the body of the fowl for compact packaging in a plastic bag or other container.

By reason of the fact that the saddle 8 is mounted in connection with the post 4 by means of the separate sleeve 5, the saddle and sleeve unit—upon loosening of the set screw 6—can be easily slipped off of the post for cleansing.

Also, as the saddle and sleeve unit are adjustable on the post, the saddle may be set in a proper vertical position for use with fowl of different kinds or sizes, and which may depend varying distances from the overhead conveyor 15.

From the foregoing description it will be readily seen that we have produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A wing joint breaker, for a fowl, adapted for co-operation with an overhead support from which the fowl is leg suspended in an inverted position; said wing joint breaker comprising a floor-supported operator's platform, a post upstanding in rigid relation from the platform, a saddle adapted to receive the breast of the fowl, and means mounting the saddle in connection with the post at an upward and outward incline opposite the platform; the saddle opening generally downwardly, and the platform being disposed so that the suspended fowl occupies a position with its breast adjacent but outwardly of said saddle whereby an operator standing on the platform and reaching forwardly on opposite sides of the saddle and, ahead thereof, initially grasping the wings of the suspended fowl, first pulls the fowl into the saddle with the breast engaged therein and then continues the pull to break the wing joints.

2. A wing-joint breaker for a fowl comprising, with means to suspend a fowl from its legs in an inverted position whereby the breast is disposed at a downward angle from the legs and in an upwardly facing position, a saddle to engage over the breast, means supporting the saddle in a downwardly facing position so that it is disposed at a downward longitudinal angle approximating that of the breast when so suspended, whereby an operator stationed behind the saddle may reach forwardly on opposite sides thereof, grasp the wing of a fowl when the breast thereof is adjacent and transversely alined with the saddle, may then pull the fowl back by the wings so as to engage the breast in the saddle, and then continue the pull on the wings to break the joints thereof, the saddle having upper and lower ends, and a pad rigid with the saddle depending from the lower end of the same in position for abutment by the craw portion of the fowl when its breast is engaged in the saddle; said saddle including a rounded down-turned tip at the upper end thereof for engagement on the abdominal portion of the fowl when its breast is engaged in the saddle and the craw portion abuts said pad.

3. A device, as in claim 2, in which the saddle, at said tip, is formed on opposite sides with upwardly extending notches.

4. A wing-joint breaker for a fowl comprising, with means to suspend a fowl from its legs in an inverted position whereby the breast is disposed at a downward angle from the legs and in an upwardly facing position, a saddle to engage over the breast, means supporting the saddle in a downwardly facing position so that it is disposed at a downward longitudinal angle approximating that of the breast when so suspended, whereby an operator stationed behind the saddle may reach forwardly on opposite sides thereof, grasp the wings of a fowl when the breast thereof is adjacent and transversely alined with the saddle, may then pull the fowl back by the wings so as to engage the breast in the saddle, and then continue the pull on the wings to break the joints thereof, and a portable platform on which the saddle mounting means is rigidly supported and forming an operator's station behind the saddle.

References Cited in the file of this patent
UNITED STATES PATENTS

| | | |
|---|---|---|
| 1,109,772 | Leyh | Sept. 8, 1914 |
| 2,188,024 | Van Meter | Jan. 23, 1940 |
| 2,560,067 | Bell | July 10, 1951 |